United States Patent [19]
Greider

[11] 3,769,903
[45] Nov. 6, 1973

[54] MEMBRANE SKINNING MACHINE
[75] Inventor: Charles Austin Greider, Des Moines, Iowa
[73] Assignee: Townsend Engineering Company, Des Moines, Iowa
[22] Filed: May 20, 1971
[21] Appl. No.: 145,216

[52] U.S. Cl. ............................... 99/589, 17/62
[51] Int. Cl. .................................... A22c 7/12
[58] Field of Search .................. 146/130; 69/11; 83/4; 17/62; 99/589

[56] References Cited
UNITED STATES PATENTS
| 3,513,893 | 5/1970 | Townsend | 99/589 |
| 2,605,495 | 8/1952 | Daniels | 17/62 |
| 3,613,154 | 10/1971 | Townsend | 17/62 |

Primary Examiner—Gerald A. Dost
Attorney—Zarley, McKee & Thomte

[57] ABSTRACT

A membrane skinning machine for severing the membrane from a meat product such as beef liver, beef tenderloin, etc. is disclosed herein. The machine includes a driven toothed roll rotatably mounted on a frame means adjacent one end of a feed table and a pressure shoe which extends around a portion of the driven roll. A skinning blade extends from the pressure shoe and is adapted to sever the membrane from the meat product as the meat product is moved thereby. A stripping roll is rotatably mounted on the frame means closely adjacent the driven roll for stripping the severed membrane from the driven roll after the membrane has passed between the driven roll and the pressure shoe. The stripping roll includes projecting spiral means on the periphery thereof which causes the severed membrane to dro or fall from the stripping roll.

5 Claims, 7 Drawing Figures

PATENTED NOV 6 1973
3,769,903
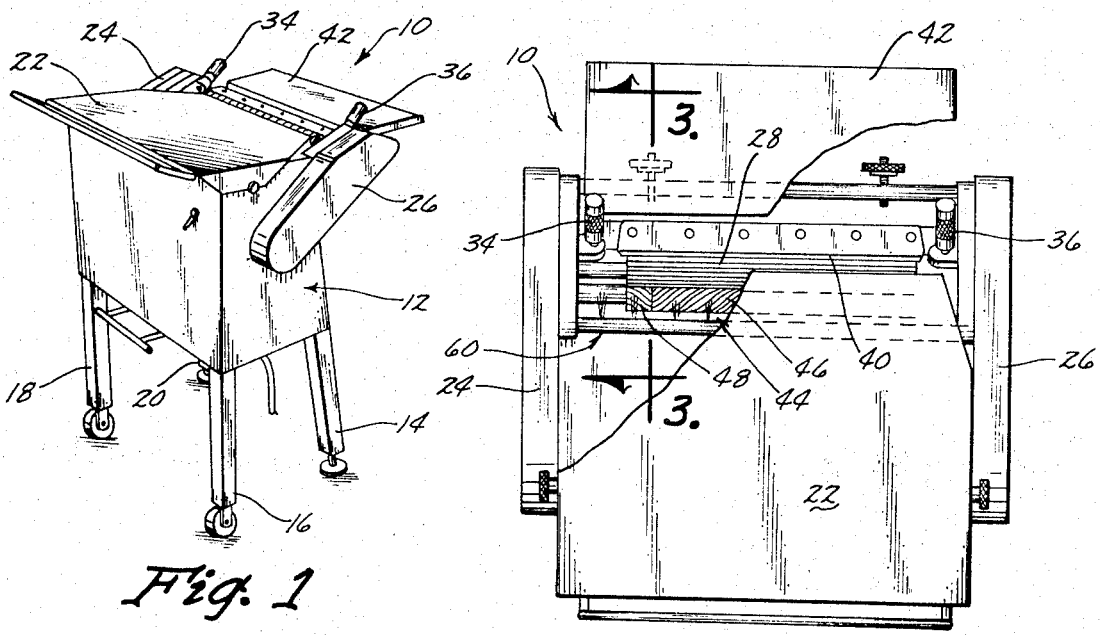
Fig. 1
Fig. 2
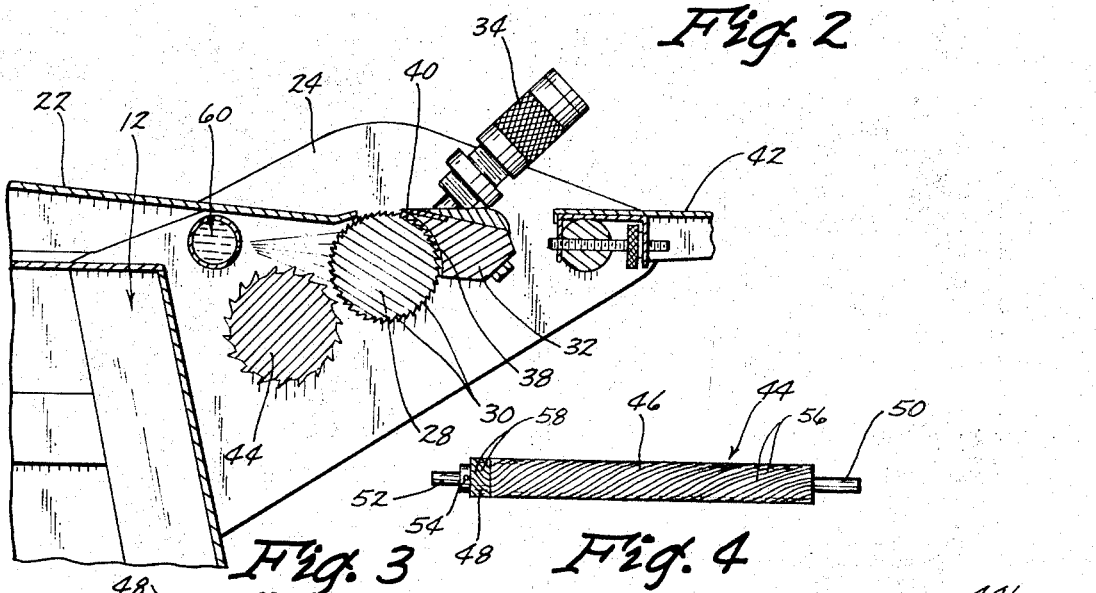
Fig. 3
Fig. 4
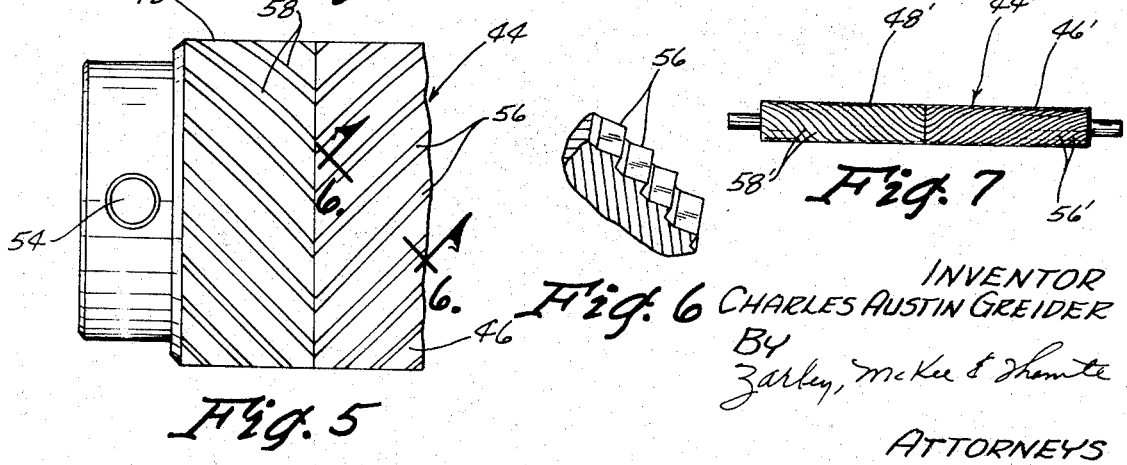
Fig. 5
Fig. 6
Fig. 7
INVENTOR
CHARLES AUSTIN GREIDER
BY
Zarley, McKee & Thomte
ATTORNEYS

MEMBRANE SKINNING MACHINE

Meat products such as beef tenderloin and beef liver have a very tough membrane thereover which must be removed before the meat product is cooked. Heretofore, attempts have been made to produce a membrane skinning machine which operated satisfactorily but such attempts have resulted in certain inefficiencies.

Therefore, it is a principal object of this invention to provide a membrane skinning machine.

A further object of this invention is to provide a membrane skinning machine which efficiently severs the membrane from a meat product such as beef liver, beef tenderloin, etc.

A further object of this invention is to provide a membrane skinning machine which includes means for efficiently severing the membrane from the meat product and means for insuring that the severed membrane will not become entangled in the machine.

A further object of this invention is to provide a membrane skinning machine including a stripping roll having means on the periphery thereof which causes the severed membrane to drop therefrom.

A further object of this invention is to provide a membrane skinning machine having a water spray means thereon which enhances the skinning operation.

A further object of this invention is to provide a membrane skinning machine which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the machine of this invention;

FIG. 2 is a top view of the machine with portions thereof cut away to more fully illustrate the invention;

FIG. 3 is an enlarged sectional view seen along lines 3—3 of FIG. 2;

FIG. 4 is a plan view of one form of the stripping roll;

FIG. 5 is an enlarged plan view of one end of the stripping roll of FIG. 4;

FIG. 6 is a view seen along lines 6—6 of FIG. 5; and

FIG. 7 is a plan view of the modified form of the stripping roll.

Referring to the drawings, the machine of this invention is generally designated by the reference numeral 10 comprising generally a frame means 12 supported by legs 14, 16, 18 and 20. A feed tray or table 22 is positioned on the upper portion of the frame means 12 to provide a convenient means for supporting a meat product thereon such as beef liver, beef tenderloin, etc. Frame means 12 includes enclosed frame members 24 and 26 at the opposite sides thereof which extend diagonally upwardly towards the discharge end of the machine. The opposite ends of the driven roll 28 are rotatably supported on the frame members 24 and 26 as illustrated in the drawings. The roll 28 is connected to and rotated by a suitable power means such as an electric motor (not shown). The roll 28 is provided with a plurality of teeth 30 which project therefrom for gripping the membrane as will be described in more detail hereinafter.

The numeral 32 refers to a conventional pressure shoe means having spring cartridge assemblies 34 and 36 at the opposite ends thereof which connect the ends of the pressure shoe means 32 to the frame members 24 and 26 respectively. Pressure shoe means 32 includes an arcuate portion 38 which extends around a portion of the periphery of the roll 28 and also includes a skinning blade 40 which projects therefrom as best illustrated in FIG. 3. The spring cartridge assemblies 34 and 36 permit the pressure shoe means 32 to "float" or move in conventional fashion with respect to the roll 28 so that the pressure shoe means and the blade 40 can compensate for various membrane thicknesses.

A table means 42 is provided on the discharge end of the machine for receiving the meat product thereon after the membrane has been removed therefrom. The numeral 44 designates a stripping roll which rotatably extends between the frame members 24 and 26 below and rearwardly of the roll 28 so that the periphery thereof is positioned closely adjacent the periphery of the roll 28 as best shown in FIG. 3. The stripping roll 44 is rotated by a suitable power means such as an electric motor (not shown). The stripping roll 44 is comprised of stripping roll portions 46 and 48 which are positioned in an end-to-end relationship as best seen in FIG. 4. The roll portion 46 is integrally formed with the shaft portions 50 and 52 which extend outwardly from the opposite ends thereof. The roll portion 48 may be comprised of a collar means which is simply slipped onto the end of shaft 52 and secured thereto by means of an Allen screw or the like extending downwardly through opening 54 into engagement with the shaft 52.

Roll portion 46 is provided with a plurality of spaced apart teeth 56 which project from the periphery thereof and which extend around the periphery of the roll portion 46 in a spiral fashion as shown in FIGS. 4 and 5. Roll portion 48 is also provided with a plurality of spaced apart teeth 58 which project from the periphery of the roll portion 48 in a spiral fashion as seen in FIG. 5. It can be seen in FIG. 5 that the direction of the spiral defined by teeth 58 is opposite to that of the direction of the spiral defined by teeth 56. The teeth 56 and 58 are coarser and more aggressive than the teeth 30 of roll 28.

The stripping roll 44' of FIG. 7 is a slight modification of the stripping roll 44 with the primary difference being that the roll portions 46' and 48' are substantially equal in length. The roll portions 46' and 48' are provided with oppositely extending or oppositely disposed spirally extending teeth 56' and 58' thereon respectively. The teeth 56' and 58 are coarser and more aggressive than the teeth 30 of roll 28.

The machine 10 is provided with a water spray means 60 which is positioned rearwardly of the roll 28 as illustrated in FIG. 3, which is adapted to spray water on the rotating roll 28 and the rotating roll 44 to improve the skinning and stripping action of the machine. The normal method of operation is as follows. The machine is activated so that the rolls 28 and 44 are rotated in clockwise directions as viewed in FIG. 3. Roll 44 is rotated at a faster rate than roll 28. The meat product to be skinned is placed on the table 22 with the membrane thereof being placed adjacent the surface of the table 22. The meat product is then moved into engagement with the skinning blade 40 which severs the membrane from the meat product as the meat product is moved therepast. The pressure shoe and skinning blade 40 can float as previously described to compensate for various membrane thicknesses. The teeth 30 on the rotating roll 28 grip the severed portion of the membrane and pull the severed portion of the membrane downwardly along the arcuate portion 28 of the pressure shoe means between the arcuate portion 38 and the periphery of the roll 28. The membrane tends to adhere to the teeth 30 and would simply wrap around the roll 28 if the stripping roll 44 were not provided. The teeth on the stripping roll engage the severed membrane on the roll 28 and strip the severed membrane therefrom due to the fact that the peripheries thereof are moving in opposite directions. The stripping action is enhanced by the fact that roll 44 is rotating faster than roll 28. Centrifugal force aids in preventing the membrane from becoming embedded in the teeth of the stripping roll 44. If stripping roll 44 were merely provided with straight teeth on the periphery thereof which were similar to the teeth 30, the severed membrane would not tend to drop from the stripping roll 44 but would tend to wrap therearound. The oppositely extending or opposing spirally arranged teeth 56 and 58 on the roll portions 46 and 48 respectively prevent the severed membrane from wrapping around the roll 44 and cause the severed membrane to drop from the roll 44. The majority of the severed membrane initially engages the teeth 56 on the roll portion 46 and has a tendency to work its way towards the roll portion 48 due to the spiral direction of the teeth 56. The severed membrane drops from the roll 44 as it engages the opposing teeth 58 on the roll portion 48. The embodiment seen in FIG. 7 is similar to the embodiment of FIG. 4 except that the roll portions 46' and 48' have substantially the same length.

The reverse or opposing relationship of the spirally arranged teeth on the roll portions effectively prevent the severed membrane from wrapping around the stripping roll and cause the severed membrane to drop downwardly therefrom. The meat product is received on the table 42 after having been skinned by the blade 40. The water spray 60 directs water onto the rotating rolls and aids in separating the severed membrane from the rolls. Thus it can be seen that the machine accomplishes at least all of its stated objectives.

I claim:

1. A membrane skinning machine comprising,
a frame means,
a driven roll rotatably mounted on said frame means,
a pressure shoe means on said frame means extending around a portion of said driven roll,
a skinning blade projecting from said pressure shoe means for severing the membrane from the product being skinned, the severed portion of the membrane being gripped by said driven roll and being passed between the periphery of said driven roll and said pressure shoe means,
a stripping roll rotatably mounted on said frame means adjacent said driven roll so that its peripheral surface rotates closely adjacent the rotating peripheral surface of said driven roll to strip the severed portion of the membrane from said driven roll, and
means for removing the severed membrane from said stripping roll,
said driven roll and said stripping roll being rotated in the same direction,
said driven roll having an irregular peripheral surface, said means for removing the severed membrane from said stripping roll comprising opposing spiral segments projecting from the periphery of said stripping roll.

2. A membrane skinning machine comprising,
a frame means,
a driven roll rotatably mounted on said frame means,
a pressure shoe means on said frame means extending around a portion of said driven roll,
a skinning blade projecting from said pressure shoe means for severing the membrane from the product being skinned, the severed portion of the membrane being gripped by said driven roll and being passed between the periphery of said driven roll and said pressure shoe means,
a stripping roll rotatably mounted on said frame means adjacent said driven roll so that its peripheral surface rotates closely adjacent the rotating peripheral surface of said driven roll to strip the severed portion of the membrane from said driven roll, and
means for removing the severed membrane from said stripping roll,
said driven roll and said stripping roll being rotated in the same direction,
said driven roll having an irregular peripheral surface, said stripping roll comprising first and second roll portions positioned in an end-to-end relationship, said first roll portion having a substantially greater length than said second roll portion, said means for removing the severed membrane from said stripping roll comprising opposing spiral segments projecting from the peripheries of said first and second roll portions.

3. The machine of claim 1 wherein said opposing spiral segments extend in opposite directions on said stripping roll from the center thereof.

4. The machine of claim 1 wherein said opposing spiral segments extend in opposite directions on said stripping roll inwardly of one end of said stripping roll.

5. The machine of claim 2 wherein said spiral segments comprise teeth, said driven roll having teeth extending therefrom which are finer than the teeth of said stripping roll.

* * * * *